United States Patent [19]

Porter

[11] Patent Number: 5,199,798
[45] Date of Patent: Apr. 6, 1993

[54] BEARING WITH TAPERED LANDS

[75] Inventor: James S. Porter, Valparaiso, Ind.

[73] Assignee: McGill Manufacturing Company, Inc., Valparaiso, Ind.

[21] Appl. No.: 825,950

[22] Filed: Jan. 27, 1992

[51] Int. Cl.⁵ .............................................. F16C 33/66
[52] U.S. Cl. .................................. 384/462; 384/465; 384/513; 384/571
[58] Field of Search ............... 384/462, 485, 513, 571, 384/569, 465

[56] References Cited

U.S. PATENT DOCUMENTS

| | | |
|---|---|---|
| 2,224,704 | 12/1940 | Stein . |
| 3,008,559 | 11/1961 | Forster . |
| 3,054,164 | 9/1962 | Recknagel . |
| 3,669,515 | 6/1972 | Nojima ............................ 384/513 |
| 3,805,934 | 4/1974 | Labadie ............................ 384/513 |
| 4,509,869 | 4/1985 | Johnston ............................ 384/462 |
| 4,641,977 | 2/1987 | Woollenweber . |
| 4,643,595 | 2/1987 | Weavers . |
| 4,822,183 | 4/1989 | Lederman . |
| 5,007,747 | 4/1991 | Takeuchi et al. ................... 384/462 |

Primary Examiner—Lenard A. Footland
Attorney, Agent, or Firm—Leydig, Voit & Mayer

[57] ABSTRACT

A bearing assembly having coaxial inner and outer bearing races, a plurality of rolling elements which ride in respective raceways in the inner and outer races, and annular sealing discs interposed between the inner and outer races for defining annular lubricant containing chambers on opposed axial sides of the rolling elements. For facilitating circulation of lubricant between moving parts during use of the bearing, the outer bearing race is formed with lands which extend axially outwardly of the raceway with a slight radially inwardly directed taper of about 10° to the bearing axis.

15 Claims, 1 Drawing Sheet

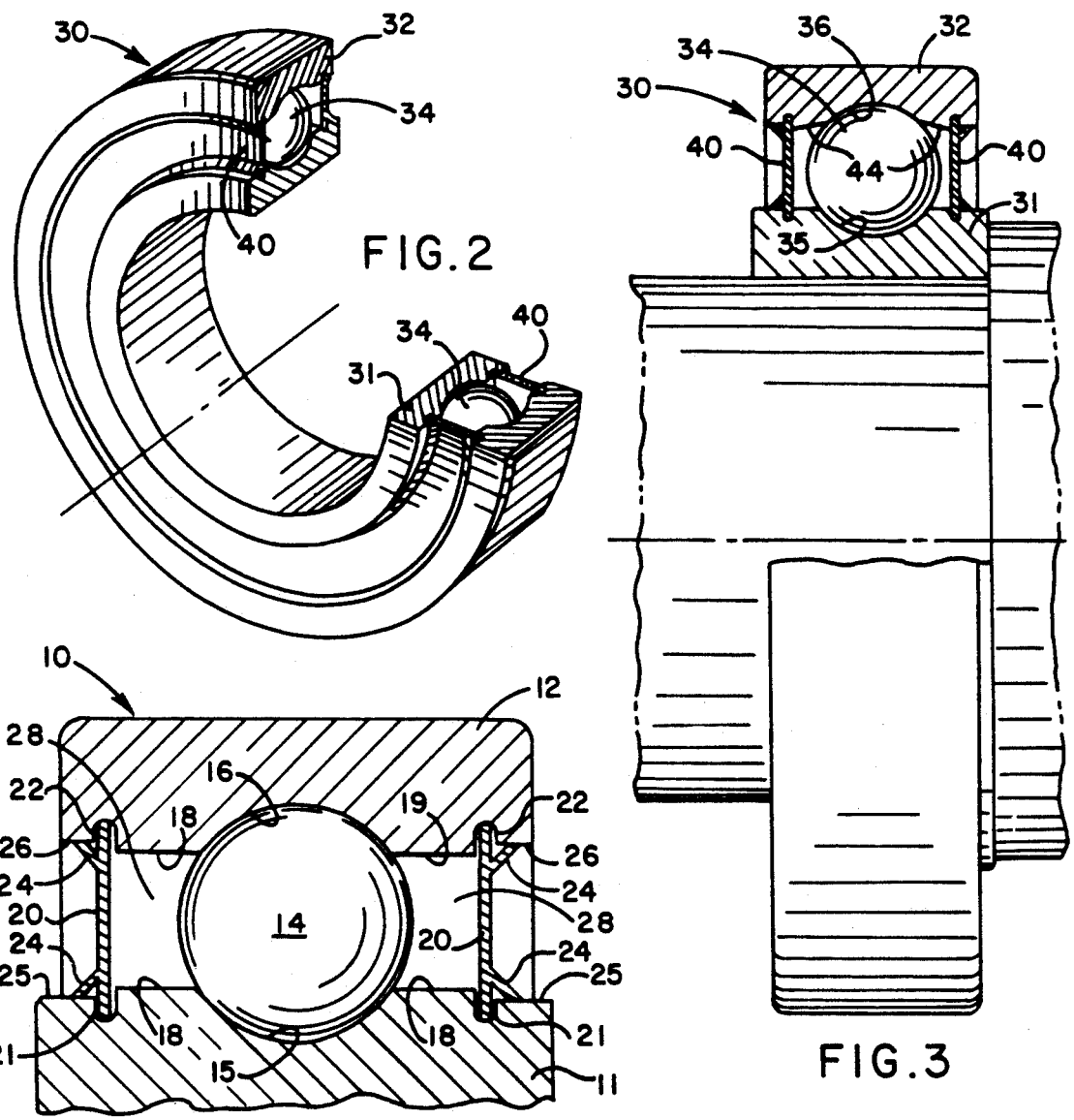
FIG. 2
FIG. 3
FIG. 1 (PRIOR ART)
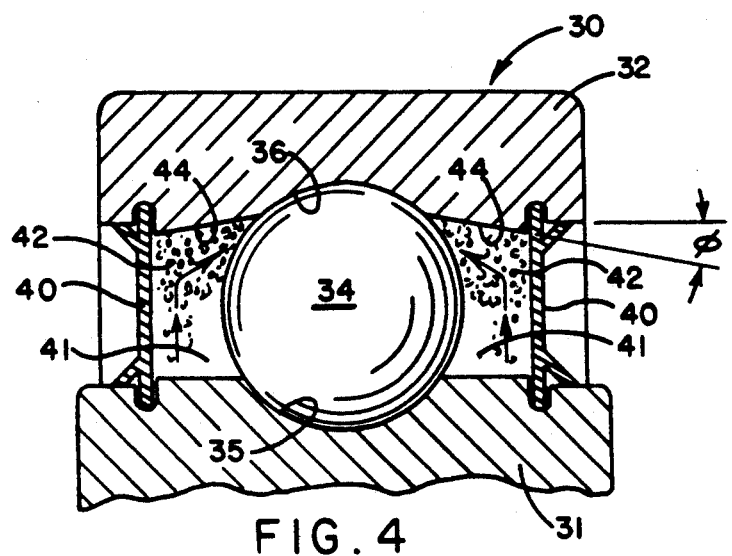
FIG. 4

BEARING WITH TAPERED LANDS

FIELD OF THE INVENTION

The present invention relates generally to bearing assemblies, and more particularly, to bearing assemblies having inner and outer races separated by a plurality of balls or other rolling elements.

BACKGROUND OF THE INVENTION

Ball bearing assemblies typically comprise inner and outer races each formed with an opposed annular raceway within which ball elements are located for relative rolling movement. Annular sealing discs are fixed between the inner and outer races on opposite axial sides thereof for defining an internal annular compartment within which the balls are disposed and within which lubricant is confined. It is desirable that such bearing assemblies have long service life since failure of the bearing commonly necessitates the costly disassemble and repair of the machinery or device with which the bearing is used. Prolonged usage of such bearings, nevertheless, often results in bearing failure. While reasons are not completely understood, the inability to maintain the relative moving bearing parts in an adequately lubricated condition, resulting in overheating and mechanical deformation and damage, often is believed to be the cause of failure. Hence, the need has existed for ball and like roller bearing assemblies with improved service life.

OBJECT AND SUMMARY OF THE INVENTION

It is an object of the present invention to provide a ball or like roller bearing assembly with improved service life.

Another object is to provide a bearing assembly as characterized above which is adapted for more effectively maintaining the relative moving bearing parts in an adequately lubricated condition for preventing overheating and mechanical deformation and damage.

A further object is to provide a bearing assembly of the above kind which has a relatively simple construction and which lends itself to economical manufacture and reliable, prolonged usage.

Other objects and advantages of the invention will become apparent upon reading the following detailed description and upon reference to the drawings, in which:

BRIEF DESCRIPTION OF THE DRAWINGS

FIG. 1 is a vertical section of a conventional ball bearing assembly of the type to which the present invention is an improvement;

FIG. 2 is a perspective, with a portion broken away, of a bearing assembly embodying the present invention;

FIG. 3 is an enlarged side elevational view, in partial section, of the bearing assembly shown in FIG. 2; and FIG. 4 is an enlarged fragmentary section of the bearing assembly shown in FIGS. 2 and 3.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Referring now more particularly to FIG. 1 of the drawings, there is shown a conventional ball-type rolling element bearing assembly 10 to which the present invention is an improvement. The bearing assembly 10 comprises inner and outer bearing races 11, 12 which capture a complement of bearing balls 14 therebetween. The inner and outer races 11, 12 are formed with opposed curved raceways 15, 16 within which the balls 14 are located for relative rolling movement. The inner and outer bearing races 11, 12 are formed with respective lands 18, 19 which extend outwardly on opposite axial sides of the raceways 15, 16 and between which disc-shaped sealing rings 20 are interposed. For retaining the sealing rings 20, the lands 18, 19 are formed with annular grooves 21, 22 for retaining inner and outer peripheral edges, respectively, of the sealing rings 20. For facilitating retention of the sealing rings 20 in mounted position, the inner and outer peripheral portions of each sealing ring 20 are formed with a respective outwardly flared retention flange 24 for engaging an outwardly exposed cylindrical lip 25, 26 of the respective bearing race 11, 12. The lands 18,19 which extend axially outwardly of the raceways 15, 16 in parallel relation to the axis of the bearing races, together with the sealing discs 20 define chambers 28 on opposed sides of the balls 14 for retaining lubricant and for excluding outside contaminants. Not withstanding such lubrication, as indicated above, bearing assemblies of such type still have been susceptible to failure after prolonged usage, which can result in costly repairs to the machinery or device with which the bearing is employed.

In accordance with the invention, a bearing assembly 30 is provided which has an improved service life. With reference to FIGS. 2-4, the bearing assembly 30 comprises co-axially disposed inner and outer bearing races 31, 32, a plurality of interposed balls 34 which ride in respective raceways 35, 36 in the inner and outer race 31, 32, and annular sealing discs 40 interposed between the inner and outer races 31, 32 on opposite axial sides of the balls 34 in spaced relation thereto for defining annular chambers 41 within which lubricant 42 is confined. The inner bearing race 31, balls 34, and sealing discs 40 in this instance are substantially similar to those previously described.

In carrying out the invention, the lands of one of said bearing races extend axially outwardly from the rolling elements in similarly tapered relation to the axis of said inner and outer races for facilitating circulation of lubricant during relative movement of said inner and outer races. More particularly, the lands are tapered in a radial direction opposite to that to which the raceway extends into the bearing race. In the illustrated embodiment, lands 44 of the outer bearing race 32 are formed with a slight taper with respect to the axis of the bearing races such that they extend axially outwardly from the raceway 36 of the outer race 32 with a radially inwardly directed taper. Each land 44 in this instance is tapered at an angle $\phi$ of about 10° to the bearing axis. Bearing assemblies with such tapered lands 44 in the outer bearing race 36 have been found to have significantly improved service life over conventional bearing assemblies of the type shown in FIG. 1.

While the theory of operation is not entirely understood, it is believed that the tapered lands 44 tend to facilitate recirculation of the lubricant 42 contained within the sealed compartments 41 by assisting in the redirection of the lubricant about the balls 34, as depicted by the arrows in FIG. 4. Such circulatory movement of the lubricant 42 under the influence of gravity and/or centrifugal forces imparted by relative movement of the bearing parts is enhanced as the temperature of the lubricant increases as a result of prolonged operation, thereby further enhancing the ability of the lubricant to maintain the relative moving bearing parts in sufficiently lubricated condition for preventing mechanical damage and bearing failure.

Comparative testing between conventional bearing assemblies of the type shown in FIG. 1 and similarly configured bearing assemblies with tapered outer lands in accordance with the present invention have demonstrated markedly improved service life of the later bearings. In a test of eight bearings of each type under similar operating conditions, the table below compares the bearings in each group in the order of their life during the test. The L-10 life represents the number of hours that 90 percent of the bearings of each group surpassed. As can be seen, the L-10 life for the bearings with the tapered outer lands was 830 hours, versus 389 hours for the conventional bearings. The average life (L-AVG.) for the bearings with the tapered lands was 17,838 hours, versus an average life of 6,975 hours for the conventional bearings.

| BRG. NO. | CONVENTIONAL BEARINGS | BEARING WITH TAPERED OUTER LANDS |
|---|---|---|
| 1 | 850.7 HRS | 1,200.2 HRS |
| 2 | 1,035.2 HRS | 3,352.9 HRS |
| 3 | 1,445.9 HRS | 3,488.8 HRS |
| 4 | 2,620.9 HRS | 3,981.4 HRS |
| 5 | 3,253.6 HRS | 11,288.6 HRS SUSPENDED |
| 6 | 3,458.8 HRS | 27,276.3 HRS |
| 7 | 13,307.7 HRS | 46,059.8 HRS |
| 8 | 29,797.4 HRS | 46,059.8 HRS |
| L10 | 389.0 HRS | 830 HRS |
| L50 | 3,996.0 HRS | 12,600.0 HRS |

Hence, it can be seen that the bearing assemblies of the present invention have significantly improved service life over conventional bearings. Yet, such bearing assemblies are relatively simple in construction and lend themselves to economical manufacture and reliable long term usage. While a ball bearing assembly in accordance with the invention has been shown and described herein, the invention also is applicable to other types of bearings, such as cylindrical roller bearings and needle roller bearings.

What is claimed is:

1. A bearing assembly comprising
   inner and outer bearing races disposed in coaxial relation to each other for relative rotational movement,
   a plurality of rolling elements interposed between said inner and outer races,
   said bearing races each being formed with lands extending outwardly from opposite axial sides of said rolling elements,
   annular sealing means between said inner and outer races on opposite axial sides thereof,
   said lands and annular sealing means defining annular chambers on opposite axial sides of said rolling elements,
   a quantity of lubricant within said chambers for lubricating said rolling elements and inner and outer bearings for facilitating relative movement, and
   said lands of at least one of said bearing races extending axially outwardly from said rolling elements in similarly tapered relation to the axis of said inner and outer races for facilitating circulation of said lubricant during relative movement of said inner and outer races.

2. The bearing assembly of claim 1 in which said inner and outer races each are formed with a rolling element receiving raceway extending into the respective race, and said tapered lands extend axially outwardly from opposite sides of the raceway of said one bearing race.

3. The bearing assembly of claim 2 in which said tapered lands extend axially outwardly of the raceway of said one race with a taper radially in a direction opposite to that which the raceway extends into said one race.

4. The bearing assembly of claim 1 in which said tapered lands are tapered at an angle of about 10° to the axis of the inner and outer races.

5. The bearing assembly of claim 4 in which the lands of the outer bearing race are tapered and the lands of the inner bearing race extend in substantially parallel relation to the axis of said inner and outer bearing races.

6. The bearing assembly of claim 1 in which said rolling elements are balls.

7. The bearing assembly of claim 1 in which said sealing means are disc-shaped sealing rings.

8. The bearing assembly of claim 7 in which said inner and outer races are formed with annular grooves for receiving respective inner and outer peripheral edges of said sealing elements.

9. A bearing assembly comprising inner and outer bearing races disposed in coaxial relation to each other for relative rotational movement,
   a plurality of rolling elements interposed between said inner and outer races,
   said bearing races each being formed with lands extending outwardly from opposite axial sides of said rolling elements,
   annular sealing means between said inner and outer races on opposite axial sides thereof,
   said lands and annular sealing means defining annular chambers on opposite axial sides of said rolling elements,
   a quantity of lubricant within said chambers for lubricating said rolling elements and inner and outer bearings for facilitating relative movement, and
   said lands of said outer bearing race extending axially outwardly from said rolling elements with a radially inwardly directed taper with respect to the axis of said inner and outer races.

10. The bearing assembly of claim 9 in which said inner and outer races are formed with respective opposed rolling element receiving raceways, and said lands extend axially outwardly from opposite sides of said raceways.

11. The bearing assembly of claim 10 in which said tapered lands are tapered at an angle of about 10° to the axis of the inner and outer races.

12. The bearing assembly of claim 11 in which said lands of said inner bearing race extend in substantially parallel relation to the axis of said inner and outer bearing races.

13. The bearing assembly of claim 10 in which said rolling elements are balls.

14. The bearing assembly of claim 9 in which said sealing elements are disc-shaped sealing rings.

15. The bearing assembly of claim 14 in which said inner and outer races are formed with annular grooves for receiving respective inner and outer peripheral edges of said sealing elements.

* * * * *